United States Patent [19]
Rigling

[11] Patent Number: 5,362,197
[45] Date of Patent: Nov. 8, 1994

[54] AUTOMATIC STORAGE AND RETRIEVAL SYSTEM

[75] Inventor: Richard Rigling, Fairfield, Ohio

[73] Assignee: Stanley-Vidmar, Inc., Allentown, Pa.

[21] Appl. No.: 86,229

[22] Filed: Jun. 30, 1993

Related U.S. Application Data

[62] Division of Ser. No. 519,932, May 7, 1990, Pat. No. 5,226,782.

[51] Int. Cl.⁵ .............................................. B65G 1/04
[52] U.S. Cl. .................................. 414/786; 414/331; 414/273; 198/347.3
[58] Field of Search ............... 414/786, 273, 331, 286, 414/277, 282, 283, 285, 266, 267, 268, 269, 270, 281, 661; 364/478; 198/347.3

[56] References Cited

U.S. PATENT DOCUMENTS

| | | | |
|---|---|---|---|
| 2,692,058 | 10/1954 | Straub | 414/280 |
| 3,738,506 | 6/1973 | Cornford et al. | 414/283 X |
| 4,529,081 | 7/1985 | Tanaka | 414/285 X |
| 4,678,390 | 7/1987 | Bonneton et al. | 414/331 X |
| 4,850,783 | 7/1989 | Maekawa | 414/281 X |
| 5,020,958 | 6/1991 | Tuttobene | 414/281 |

FOREIGN PATENT DOCUMENTS

| | | | |
|---|---|---|---|
| 1168814 | 4/1964 | Germany | 414/286 |
| 1228194 | 11/1966 | Germany | 414/281 |
| 3442161 | 5/1986 | Germany | 414/331 |
| 8300353 | 8/1984 | Netherlands | 414/285 |
| 727456 | 4/1980 | U.S.S.R. | 414/331 |

*Primary Examiner*—Frank E. Werner
*Attorney, Agent, or Firm*—Plevy & Associates

[57] ABSTRACT

A system for storing and retrieving items to and from a storage receptacle which includes a track riding dolly carrying a robotic item handler for inserting and extracting items to and from storage. The dolly also carries a multishelved caddy for receiving a plurality of items thereon. The item handler has the capacity to access each of the shelves of the caddy and may execute, under computer control, a selected sequence of item transfers between the caddy and storage during a single passage of the dolly from an on/off load point past the storage receptacle. A multishelved caddy loader queues a plurality of items received from an on-load device independently of the caddy, via vertical repositioning, and performs a bulk transfer of the queued items to the caddy when the caddy is available. A mass offloader device permits the bulk transfer of a plurality of items from the caddy to an offload receiver. A unit offloader sequentially offloads the offload receiver, via vertical repositioning of the offload receiver, onto an offload surface independently of the caddy.

9 Claims, 4 Drawing Sheets

AUTOMATIC STORAGE AND RETRIEVAL SYSTEM

This is a division of application Ser. No. 07/519,932, filed May 7, 1990, now U.S. Pat. No. 5,226,782.

BACKGROUND OF THE INVENTION

1. Field of the Invention

The present invention relates to automatic storage and retrieval systems generally, and more particularly to computer controlled, high throughput, industrial storage and retrieval systems.

2. Description of the Prior Art

Most industrial operations require on-site storage and retrieval of items. In the field of manufacturing, for example, a stock of the components of a manufactured item must be maintained on the premises and made available to a production or assembly line. For peak efficiency, component flow to the assembly line should be uninterrupted and should be paced to allow the assembly line to produce at their maximum capacity without having to wait for parts. The parts storage area must be space efficient, to minimize real property, building and heating and air conditioning costs, while, at the same time, being maximally accessible. An inherent conflict exists between space efficiency and ease of access since the surface area of a particular storage configuration, through which access is provided to the items stored within the space, is inversely proportional to volumetric efficiency. In addition, there is a competition between personnel and functions within the manufacturing environment for access to the stored goods, but it is, however, also desirable to be isolated from the clutter and activity associated with storage and retrieval facilities and functions. The feasibility of a particular spatial configuration and location of a storage area further depends upon the means of storage, e.g., bins, shelves, hooks, drawers, etc., the means for placing an item in storage, e.g., by hand, with a crane, with a forklift, etc., the means for retrieving an item from storage and the nature of the item stored.

Numerous strategies have been employed over the years for providing suitable storage and retrieval systems. Many have utilized bays of storage shelves upon which goods are stored and retrieved by a person (stocker). Frequently, large shelving systems require ladders, gantries and catwalks to permit stockers to gain access to items stored at higher levels. If high item throughput is required, an increased number of stockers seeking access to the stored items and utilizing the same catwalks and access aisles must be employed. Machinery under stockers' control, such as forklifts, are frequently employed to assist stockers by providing them with increased lifting power. This machinery, however, also increases the stockers' profile in the access channels to the storage area and thus increases congestion, slows throughput, and creates a safety hazard. Dumbwaiters, elevators, conveyor belts and other item transport means save stockers' steps but limit throughput to the speed of the transport means, which is frequently shared by several stockers. The storage and retrieval of items by human stockers is a labor intensive task, is often dangerous and repetitive, and sometimes results in the breakage of items padding through the system.

Besides the physical arduousness associated with the transfer of items to and from storage, a prime consideration in the material handling field is the maintenance of inventory records. A count of items on hand must be kept to trigger reordering of items before they run out. Either a running tally must to be maintained, requiring the constant, contemporaneous recordal of storage and retrieval transactions in a common record, or an exhaustive periodic inventory, wherein all items are counted, must be conducted. Both methods require significant time and effort. A record of the location of stored items must also be kept, or the items must be stored in a predetermined order, to facilitate retrieval.

Recently, automated storage and retrieval systems have been devised for remedying the limitations of traditional storage and retrieval systems. One type employs independently moving tiers of shelves that move radially around an oval track enabling items, or spaces for items, to be brought into proximity to an on/off load point. This device allows access to a storage space or an item by moving it to the stocker for storage/retrieval (placing/picking) rather than the stocker going to the storage space or item. Frequently, a robotic stocker or item handler (inserter/extractor) is utilized for transferring items to and from the movable shelves (placing/picking) from and to the on/off load point, which can be any supporting surface—including another means of conveyance such as a conveyor belt. Modern automated material handling systems typically utilize a computer controller for controlling and coordinating each mechanism in the system. Optic, acoustic and tactile sensors are used to sense the position of items and material handling mechanisms and relay this data to the computer controller which may then direct the activity of system machinery based upon the sensory input. Optical sensors for reading bar codes affixed to items, as well as, key entry terminals, allow computer controlled automatic storage and retrieval systems to constantly maintain and update item location and inventory records as item transfers occur.

An automated material handling system designed by Stanley Vidmar, Automated Systems is representative of state of the art techniques pertinent to the present invention. This system, appearing in the January, 1988 edition of AUTOMATION, includes parallel banks of stationary wire-rack storage shelves having a single aisle therebetween. A computer controlled robotic item handler (inserter/extractor) travels on tracks down the aisle between the shelf banks for placing/picking items carried in standard tote boxes to/from the wire rack shelving. The robotic item handler can be elevated to varying levels to permit higher or lower shelves to be accessed. Upon retrieving a tote from the rack storage, the robot must travel down the track and deposit the tote at an on/off load point. After disposing of a carried tote at the on/off load point, the robot is then free to place or pick another tote. The time for each item transfer between the on/off load point and the place/pick point includes the travel time required for the robot to move from the on/off load point to the place/pick point and back again. This system has great utility in that it provides for high density storage which is accessed by a single robot riding in a single aisle, thereby avoiding the congestion, hazard and breakage associated with human stocker systems. This strategy, while very useful, requires substantial robotic travel time, energy and wear in order for the robot to service the storage area.

It is therefore an object of the present invention to provide an automated storage and retrieval system which is faster than presently known systems.

It is a further object to provide an automated storage and retrieval system which is more efficient than known systems in terms of energy and wear.

It is yet another object to provide the aforesaid advantages without a substantial increase in cost over, or substantial modifications to, known systems.

SUMMARY OF THE INVENTION

The problems and disadvantages associated with known automatic storage and retrieval systems for storing and retrieving items to and from a storage area are overcome by the present invention which includes a track riding dolly with a computer controlled locomotor for carrying a robotic item handler for inserting and extracting items to and from a shelf. The dolly also supports a multishelved caddy for receiving and carrying a plurality of items thereon. The item handler is carried on an elevator platform which is lifted and lowered under computer control to varying levels to permit it to reach items stored at various heights. The item handler removes items from the shelving, deposits them on selected shelves of the caddy and has the capacity to perform the reverse operation. The computer may position the dolly at any number of positions along the track and invoke any combination of transfers between storage shelves and the shelves of the caddy. Multiple transfers may be performed during any one cyclic passage of the dolly from a point of departure through the shelf area and back again, or in transit through the shelving from one offload/onload station to another. A vertically moveable caddy loader at an onload station, has a plurality of shelves matching those of the caddy, sequentially receives a plurality of items from a vertically stationary onloader located at the onload station and includes a plurality of pushers for simultaneously or sequentially pushing the plurality of items from the caddy loader to the caddy. A mass offloader at an offload station, has a plurality of pushers similar to the caddy loader pushers, transfers items simultaneously or sequentially from the caddy to an offload receiver. A unitary offloader sequentially offloads items from the offload receiver to an offload device.

BRIEF DESCRIPTION OF THE FIGURES

For a better understanding of the present invention, reference is made to the following detailed description of an exemplary embodiment considered in conjunction with the accompanying drawings, in which.

DETAILED DESCRIPTION OF THE FIGURES

Figure 1:
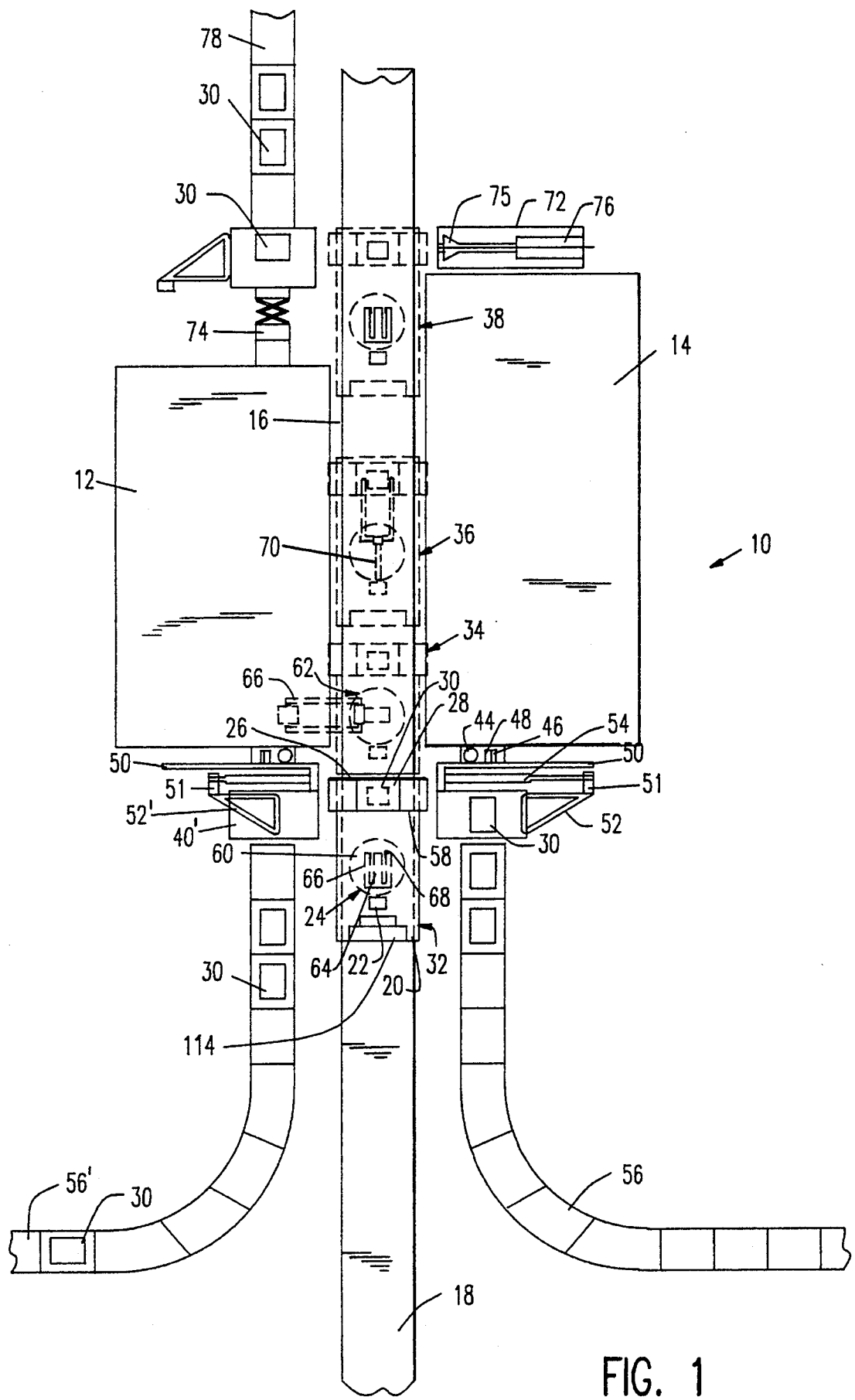
FIG. 1 is a top plan view and schematic diagram of an automatic storage and retrieval system constructed in accordance with an exemplary embodiment of the present invention illustrating a number of operating positions of the components of the system.

Referring to FIG. 1, there is shown an automatic storage and retrieval system 10 having first and second shelf banks 12 and 14 with an aisle 16 therebetween. A track 18 is disposed in the aisle 16, for carrying a dolly 20 which rolls on the track between the shelf banks 12 and 14. The dolly 20 carries on its upper surface a vertical mast 22 which supports a robotic item handler 24. A caddy 26 extends vertically from the upper surface of the dolly 20, parallel to the mast 22 and includes a plurality of caddy shelves 28 (only the top shelf is visible in this view) for supporting a corresponding plurality of items 30. The movement of the dolly 20 and the operation of the item handler 24 that is visible when viewed from the perspective of FIG. 1 is illustrated in a first position 32 shown in solid lines, and in second, third, and fourth positions, 34, 36, and 38 respectively, shown in dashed lines. In the first position 32, the caddy 26 is juxtaposed with a caddy loader 40 having a plurality of shelves 42 (Only a top shelf 42 is visible in this view. Please see FIG. 3 for the vertical profile.) for receiving a plurality of items 30 thereon. The caddy loader 40 is lifted and lowered by a caddy lift motor 44 acting through a lift sprocket 46 and lift chain 48 which attaches at one end to a backframe 50 of the caddy loader 40. While the caddy lift motor 44 is shown mounted at a level above the the caddy, it the may be mounted at any convenient location along the chain drive path and could as well be disposed toward the bottom of the caddy loader 40. For simplicity of illustration, only one lift sprocket 46 and lift chain 48 are depicted, it may, however, be preferable, depending upon the application, to utilize a pair of parallel chains 48 and mating sprockets 46. The backframe 50 slideably supports a pusher frame 51 having a plurality of pusher arms 52 extending therefrom and matching the plurality of shelves 42 of the caddy loader 40, both in number and spatially, as can be seen more clearly from FIG. 3 discussed at length below. The pusher frame 51 is selectively moved away from or towards the shelves 42 of the caddy loader 40 by a telescoping double acting cylinder 54 driven by a compressed fluid such as air or hydraulic fluid or by other conventional means such as a rack and pinion. The capacity of the caddy loader 40 to be lifted and lowered is utilized in cooperation with a fixed level loading device, here a conveyor 56, which conveys an item 30 to the caddy loader 40, loads the item 30 onto a caddy loader shelf 42 and then stops. The caddy loader 40 may then be raised or lowered so that a second item 30 may be loaded by the conveyor 56, onto a second shelf 42, and so on, until all or the desired number of the shelves 42 of the caddy loader 40 are filled. After having filled the shelves 42 and the dolly 20 having assumed the position shown in the first position 32 with the caddy 26 juxtaposed with the caddy loader 40, the double acting cylinder 54 may be activated to urge the backframe 51 and pusher arms 52 toward the items 30 occupying the plurality of shelves 42 of the caddy loader 40. Continued urging of the pusher arms 52, results in the transfer of items 30 from the caddy loader shelves 42 to the caddy shelves 28. A shelf extension 58 may be provided on the edge of each caddy shelf 28 to more closely bridge the gap between the caddy loader shelves 42 and caddy shelves 28.

An additional conveyor 56', caddy loader 40', etc., is depicted on the left side of the track 18 with the pusher arms 52' positioned at a point of maximum inward travel toward the caddy 26. Any number of caddy loaders 40 may be utilized in the system, so long as, they are positioned proximate the track 18 to permit the caddy 26 to be drawn closely enough to allow item transfer.

The first position 32 further illustrates a 180-degree rotatable platter 60 of the item handler 24 which supports thereon an item gripper 62. The item gripper 62 has an articulator portion 64 and a gripper effector portion 66 which in this illustration is a pair of effectors 66 extending in parallel and which are urged together and apart by the articulator 64. Other forms of gripper effectors 66 may be used depending upon the nature of the items being handled, for example, clamp-type, articulated finger, vacuum, and magnetic effectors. The item gripper 62 is extensibly mounted on a horizontal track 70 which, at least partially, traverses the geometric major chord of the rotatable platter 60. Thus, in the second position 34, the rotatable platter 60, is depicted rotated 90 degrees counter-clockwise from its attitude as shown in the first position 32. Item gripper 62, in the second position 34, is shown extended, having traveled down its horizontal track 70, and with the gripper effectors 66 embracing an item 30. This position is common both to the placing of an item 30 on a shelf of the shelf bank 12 and to the picking of an item 30 from the shelf bank 12. The third position 36 illustrates the rotatable platter 60 in the same attitude as that shown in the first position 32, but with the item gripper 62 extended such that the gripper effectors 66 embrace an item 30 positioned on a caddy shelf 28. The third position 36 illustrates that the item gripper 62 can deposit or remove items on/from the caddy shelves 28. In the fourth position 38, the dolly 20 is parked so that the caddy 26 is juxtaposed with a mass offloader 72 to its right and a caddy loader 40 in offload mode (or offload receiver) to its left. The backframe 50, pusher frame 51, double acting cylinder 54, caddy lift motor 44, lift chain 48, and lift sprocket 46, are stripped away to reveal a unit offloader 74. Although the caddy loader 40 in offload mode (or offload receiver) depicted at position 38 includes pusher arms 52, and is described as having the associated equipment to actuate them, it may well be the case, depending on the application, that the caddy loader 40 utilized for offloading may not require these features, and in that situation it would be preferable to omit them from the caddy loader 40, which, in that case would be more properly referred to as simply the offload receiver. The mass offloader 72 is constructed in accordance with principles similar to the caddy loader pusher frame 51, with a plurality of pusher arms 75 matching the plurality of caddy shelves 28 in number and spatially and activated by a double acting mass offloader cylinder 76 or another equivalent linear displacement device. The mass offloader 72 is unique in that its pusher arms 75 act directly on the items 30 stored on the caddy shelves 28 and push them from the caddy 26 onto a caddy loader 40 in offload mode as shown in the fourth position 38. The mass offloader 72 clears all the caddy shelves 28 in one pushing cycle and thereby immediately frees the system 10 to advance to the next storage/retrieval task. The unit offloader 74 acts in concert with the caddy loader 40 lift mechanism (lift motor 44, lift sprocket 46 and lift chain 48) to sequentially unload a plurality of items on the caddy loader shelves 28 onto a horizontally fixed unitary offload device or surface, here a conveyor 78. In the embodiment shown, a scissors-type unit offloader 74 is employed, but any equivalent displacement device, such as a double acting cylinder, could be employed to push the items 30 from the caddy loader shelves 28. The unitary offloading occurs in a manner similar to the sequential loading of the caddy loader 40, in that, a shelf 28 of the caddy loader 40 is positioned at a level which permits the unit offloader 74 to push the item 30 onto the conveyor 78. The unit offloader 74 retracts and the caddy loader 40 is lifted or lowered to permit the next higher or lower shelf 28 to be offloaded, etc.

Figure 2:
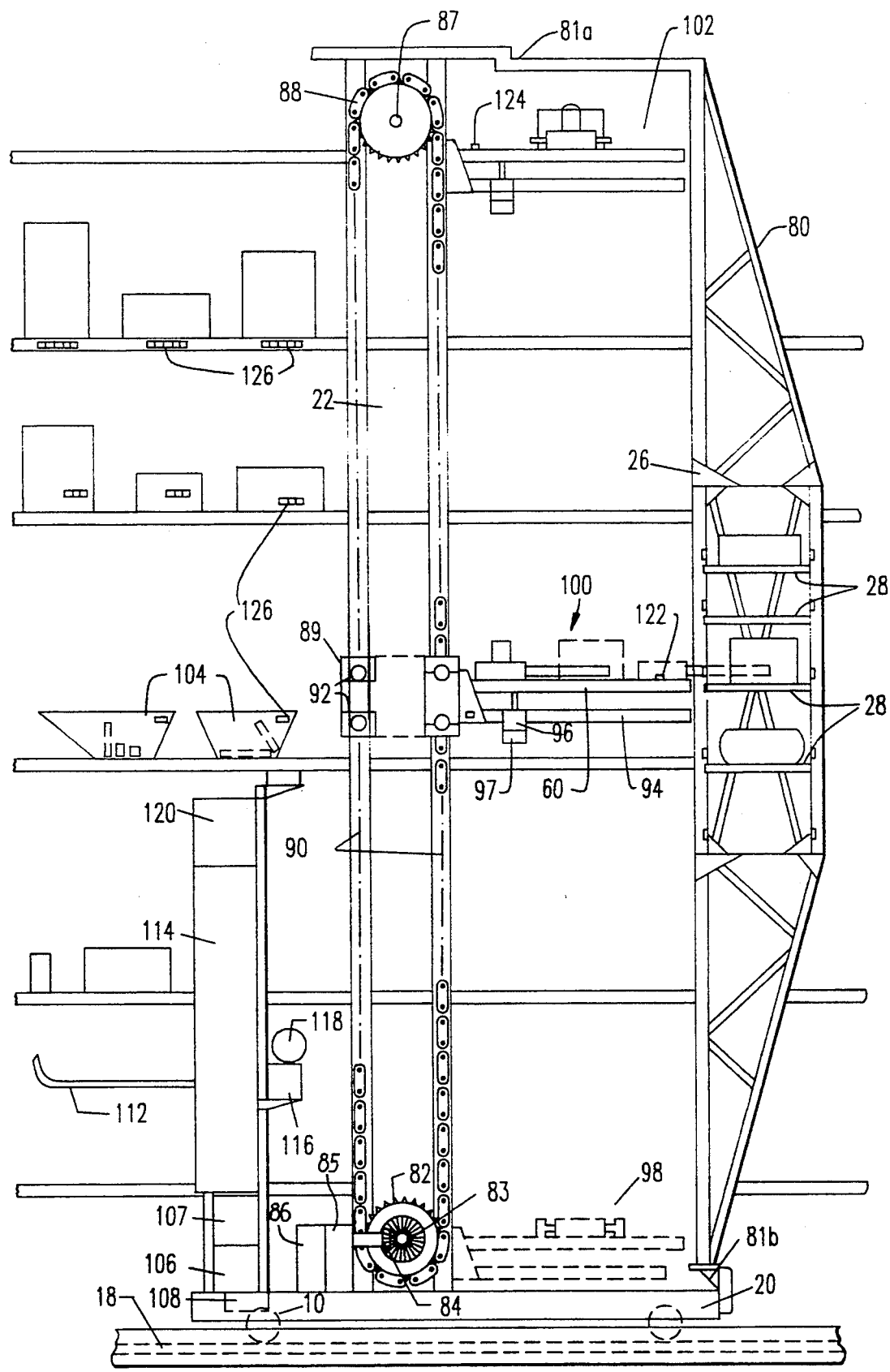
FIG. 2 is a side view in elevation of a track riding motorized dolly for carrying a robotic elevatable item handler and a multi-shelved caddy, constructed in accordance with an exemplary embodiment of the present invention, in position proximate storage shelving.

Referring now to FIG. 2, the dolly 20 and its load are shown in greater detail. A plurality of caddy shelves 28 are held in vertical orientation to each other by a caddy framework 80 having an upper and a lower mounting 81a and 81b. The lower mounting 81b is affixed to the dolly 20 and the upper mounting 81a is affixed to an upper portion of the mast 22 so that the caddy 26 is substantially parallel to the mast 22. The mast 22 includes near its juncture with the dolly 20, an elevator sprocket 82 mechanically conjoined to a sprocket gear 83. The sprocket gear 83 is turned by a drive gear 84 driven by an elevator motor 85, the shaft of which is acted upon by an elevator brake 86 for holding the shaft in a desired position after the motor 85 has been depowered. The elevator sprocket 82 is matched at the opposite end of the mast 22 by an idler sprocket 87. A continuous loop of chain 88 runs over and meshes with the elevator sprocket 82 and the idler sprocket 87. A mast cuff 89 slideably embraces the mast 22 and is affixed to the continuous loop of chain 88 such that rotation of the elevator sprocket 82 in a clockwise direction causes the mast cuff 89 to be lowered and counterclockwise rotation causes the cuff 89 to slide up the mast 22. The mast 22 may be provided with guides 90 for guiding cuff wheels 92 to promote smooth operation. Of course, numerous alternative methods for selectively raising and lowering the mast cuff 89 exist, including, for example, hydraulic cylinders, cables, and/or a cuff resident motor with a gear for meshing with a rack affixed to the mast 22. Similarly, numerous alternatives exist for braking the mast cuff's movement, such as, for example, a cuff resident hydraulic or compressed air brake acting against the mast 22. The mast cuff 89 serves as the point of attachment for an item handler base 94 which supports the rotating platter 60. A platter motor 96 is provided in the base 94 and turns a gear (not shown) for engaging a cooperating platter gear or gear ring (also not shown) on the underside of the platter 60. The platter motor 96 permits the platter 60 to be rotated to a selected position. For simplicity of illustration, a platter brake 97 is shown in association with the platter motor 96 for slowing and/or stopping the platter motor 96 and the platter 60. The preferred means of platter position control, however, are discussed below in reference to FIGS. 4 and 5. The platter brake 97 depicted in FIG. 2 operates upon the platter motor 96 shaft but could equally well operate upon the platter 60 itself or in numerous other alternative conventional ways. Similarly, the platter motor 96 could be located on the platter 60 itself or operate through a belt or chain drive. In FIG. 2 the item handler 24 is shown in three positions to illustrate operation, viz., a lower position 98, an intermediate position 100 and an upper position 102. In the intermediate position 100 the item gripper 62 is depicted in solid lines retracted and grasping an item 30 shown in dashed lines. The intermediate position 100 further illustrates the item gripper 62 in dotted lines extended forward depositing or retrieving an item 30 on/from a caddy shelf 28. The lower position 98, shows the item handler 24, after having been lowered by means of the elevator motor 85, etc. to a level proximate the lowest shelf in the shelf bank 12 with the item gripper 62, turned towards the viewer via a 90 degree clockwise rotation of the rotatable platter 60 from its attitude in the intermediate position 100. In this view, the item gripper 62, is shown without an item 30 and the gripper pads 68 are visible. The upper position 102 illustrates the item gripper 62 after having been elevated to a higher level, towards the upper limit of its travel, and with the item gripper 62 turned towards the shelf bank 12 and gripping an item 30, The item gripper 62 achieves this position over the position shown in the intermediate position 100 by a 90-degree counterclockwise rotation of the rotatable platter 60. FIG. 2 further illustrates a number of items 30 having varying dimensions positioned on the shelves of the shelf bank 12. The item gripper articulator 64 may be provided with the capacity to open the gripper effectors 66 to accommodate items 30 of varying dimensions. The preferred alternative to the foregoing, is to store all items in uniform totes or bins 104 having uniform external dimensions and crushability and able to carry non-uniform contents. The uniform totes 104 can be designed to include specialized gripper surfaces (not shown) that cooperate with gripper pads 68 to enhance the grip on the tote 104. The uniform tote 104 simplifies the sensors required to be associated with the item gripper 62 as well as the data required to be maintained and used by a computer controller.

The dolly 20 illustrated in FIG. 2 further includes a locomotor 106 dolly brake 107 and transmission 108 for mechanically transmitting and controlling power from the locomotor 106 to the wheels 110 of the dolly 20. An electric supply cable 112 is shown entering an electrical supply cabinet 114 located on the dolly 20. The electrical supply cabinet 114 would typically be the location where the power supply is distributed and fused for the supply of electric power to the various electronic components of the system, i.e., the locomotor 106, elevator motor 85, etc. An on-board air compressor 116 and corresponding air tank 118 is affixed to the electrical supply cabinet 114 and would normally be used to supply compressed air for the operation of, e.g., the gripper effectors 66 and such other devices that are conveniently driven by compressed air. It should be noted that the modes of activating and deactivating the animated components of the system of the present invention are multiple, for example, electric power could be employed to operate the articulator 64 of the item gripper 62 but it is equally feasible to operate it with compressed air or with a hydraulic system, such interchangeability being known to one normally skilled in the art.

A computer controller 120 is placed inside the electrical supply cabinet 114 and controls and coordinates the various electro/pneumo/hydro/mechanical devices in the system. The computer controller 120 is depicted on-board the dolly 20 but could equally well reside off the dolly 20 and remain in communication with the systems carried on the dolly 20 by means of a control line. Similarly, using known techniques, it would be possible to have a specialized controller on-board associated with a means of communication such as an electromagnetic wave, e.g., radio, micro, or infrared, receiver for receiving a signal generated from an electromagnetic wave sender attached to a off-board control computer. The computer controller 120 accepts store and retrieve instructions and can be used for any other data collection function associated with the system, for example, through-put data collection. Inventory and item location data would typically be maintained by an off-board computer. The computer controller 120 may be programmed to calculate the most efficient sequence of storage and retrieval operations given a series of requests.

A variety of sensors, each well known in the robotic art, may be employed to expedite the storage and retrieval functions of the system. The position of all movable components in the system must be monitored, for example, the position of the dolly 20 on its track relative to the shelf banks 12 and 14 and the caddy loader 40, the height of the item handler 24, the degree of rotation of the item handler platter 60, the degree of extension of the item gripper 62, the position of the gripper arms 66, etc. Typically, this information is supplied through the use of optical, acoustic and/or tactile sensors for sensing the interruption of a beam, proximity, and contact. A proximity sensor 122 is depicted in association with the item handler 24 for sensing proximity of the item gripper 62 to items 30. Similar sensors are used for each of the position monitoring tasks required by the system and are not shown. A bar code reader 124 is shown affixed to the rotatable platter 60 and a number of bar code labels 126 are depicted affixed to shelves of the shelf bank 12, to varying items 30, and to uniform totes 104. Bar code labels can be used to identify items 30, their characteristics, e.g., weight, and/or to supply position data. It should be evident therefore, from the figures and from the foregoing description of FIGS. 1 and 2, that the present invention has the capacity to carry a plurality of items 30 on the caddy shelves 28 and conduct any sequence of transfers of items 30 between the caddy shelves 28 and the shelves of the shelf bank 12. The loading and unloading of the caddy 26 by the caddy loader (/unloader) 40, already briefly described in reference to FIG. 1, shall now be described in more detail in reference to FIG. 3.

Figure 3:
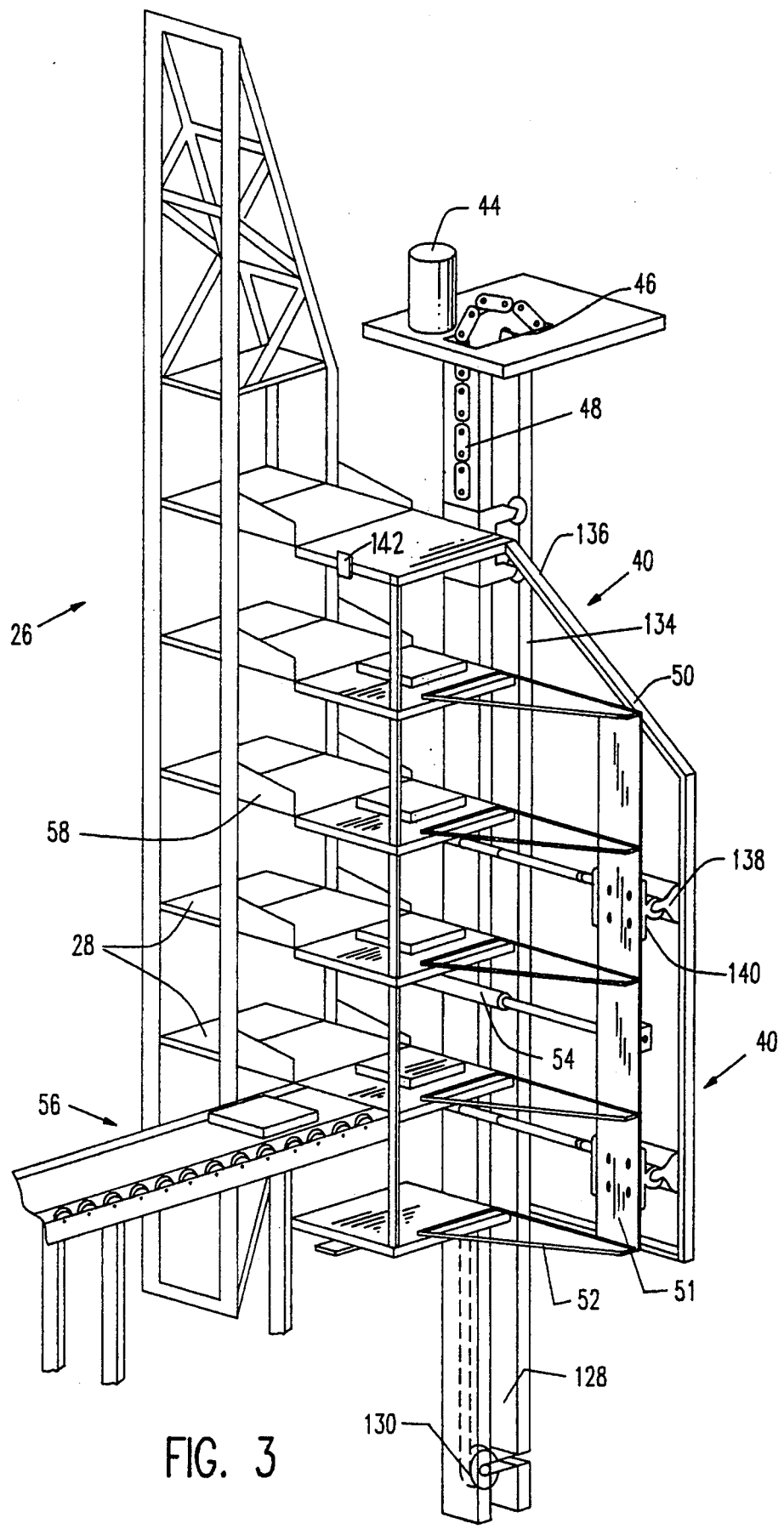
FIG. 3 is a perspective view of a multi-shelved, vertically moving caddy loader with backframe and associated item pusher equipment coming into alignment with the plural shelves of a juxtaposed caddy such as that shown in FIG. 2. A conveyor is also depicted for loading shelves of the caddy loader between vertical moves.

FIG. 3 depicts a caddy loader 40 alongside a caddy 26 preparing for a transfer of items from the caddy loader 40 to the caddy 26. For the sake of simplicity, the dolly 20, upon which the caddy 40 rides, is not shown. A conveyor 56 is situated in front of the caddy loader 40 such that items 30 may be conducted by the conveyor 56 onto the caddy loader shelves 42. The conveyor 56 may include at its terminus a pusher mechanism (not shown), as is common in the art of material handling, for assisting in the transfer of items from the conveyor 56 to the caddy loader shelves 42. The conveyor 56 depicted is vertically fixed at one level relative to the floor as is the caddy 26. The caddy loader 40, on the other hand, is vertically moveable by means of the caddy lift motor 44 acting through the lift sprocket 46 and lift chain 48. The lift motor 44 and sprocket 46 are positioned at the upper end of a vertical caddy loader guide bar 128. A corresponding idler sprocket 130 is situated at the bottom portion of the guide bar 128 over which the lift chain 48 passes and with which it engages to form a continuous loop. The caddy loader 40 includes a shelf framework 134 for supporting the plurality of parallel vertically oriented shelves 42. A backframe 50 is affixed to the shelf framework 134 and provides a point of attachment to the lift chain 48 which supports and suspends the caddy loader 40 and which allows the caddy loader 40 to be repositioned vertically. A set of caddy loader guide wheels 136 attach to the backframe 50 and capture the vertical guide bar 128 therebetween to promote smooth operation and to restrict the motion of the caddy loader 40 to the desired vertical motion. The caddy loader pusher frame 51, with its associated pusher arms 52, is slideably attached to the backframe 50 by at least one backframe slide bars 138 which are slideably grasped by mating slide bar riders 140 affixed to the pusher frame 51. The pusher frame 51 is moved relative to the caddy loader shelves 42 and back frame 50 by means of a double acting telescoping cylinder 54 which is affixed at one end to the backframe 50 and at the other end to the pusher frame 51. The telescoping cylinder 54 can be driven by compressed air or hydraulic fluid or could be replaced by a motorized rack and pinion or other suitable conventional means for accomplishing the same function. While a unitized pusher frame 51 and pusher arm 52 assembly for simultaneously sweeping all shelves 28 of items 30 is illustrated in the figures, minor design changes within the skill level of the normal artisan could render a set of individually moveable pusher arms 52 that could be activated selectively to effect, e.g., a sequential loading of caddy shelves 28. Similarly, the configuration of the backframe slide bars 138 and mating riders 140 is subject to implementation by numerous well known methods differing from that shown and described herein.

In operation, the caddy loader 40 is filled with a plurality of items 30 by sequentially loading the caddy loader shelves 42 by means of the conveyor 56. The caddy loader 40 is vertically positioned so that an empty shelf 42 is at the same level as the conveyor 56. An item 30 is carried by the conveyor 56 and slid onto the shelf 42. An optical sensor 142 is directed across the threshold of the caddy loader 40 to sense when an item 30 is in transit from the conveyor 56 to the caddy loader 40. When the item 30 completely passes from the conveyor 56 to the caddy loader shelf 42, the computer controller 120 directs the conveyor 56 to be stopped to permit the caddy loader 40 to be repositioned vertically to bring an empty shelf 42 in tandem with the conveyor 56. This process is continued until the caddy loader 40 is filled or until the system determines that it is desirable to convey the contents of the caddy loader 40 to the caddy 26. While the caddy loader 40 is being filled with items 30, the remainder of the system including the dolly 20, the item handler 24, and the caddy 26 are free to perform whatever functions the computer controller 120 directs. When the dolly 20 is instructed by the computer controller 120 that the transfer of the caddy loader contents to the caddy 26 is the next step to be performed, the dolly is caused to travel down the track 18 so that the caddy 26 is positioned next to the caddy loader 40. The caddy loader pusher frame 51 is then induced to move by the double acting cylinder 54 so that the pusher arms 52 push the items 30 from the caddy loader 40 to corresponding shelves 28 on the caddy 26. As soon as the bulk transfer from the caddy loader 40 to the caddy 26 takes place, the pusher arms 52 are returned to their at-rest position and the dolly 20 may be moved from the loading position and travel down the track between the shelf banks 12 and 14. While in transit through the shelf banks 12 and 14, the item handler 24 may under computer control, execute any sequence of item transfers between the shelves 28 of the caddy 26 and the shelves of the shelf banks 12 and 14 deemed desirable. As soon as the pusher arms 52 of the caddy loader 40 are returned to their at rest position, the caddy loader 40 is free to begin the sequential loading process as before and independent of the other components of the system, with the exception of the conveyor 56 which is supplying the items 30 to the caddy loader 40.

Assuming that a retrieval of items from the shelf banks 12 and 14 has occurred and the caddy 26 is returned with a full complement of items 30 on the plurality of caddy shelves 28, a mass unloading of the caddy 26 can be performed by the mass offloader 72. As previously described in reference to FIG. 1, this is accomplished by positioning the caddy 26 between the mass offloader 72 and a caddy loader 40; activating the mass offloader cylinder 76 to urge the offloader pusher arms 75 against the items 30 stored on the caddy shelves 28 and pushing them therefrom onto the corresponding shelves 42 of the juxtaposed caddy loader 40. The dolly 20, caddy 26 and item handler 24 are then free to perform additional tasks. Given a full caddy loader 40 and a offload conveyor 78, a unitary offloader 74 can be utilized to clear the items 30 off the caddy loader 40 in a sequential fashion as previously described.

Figure 4:
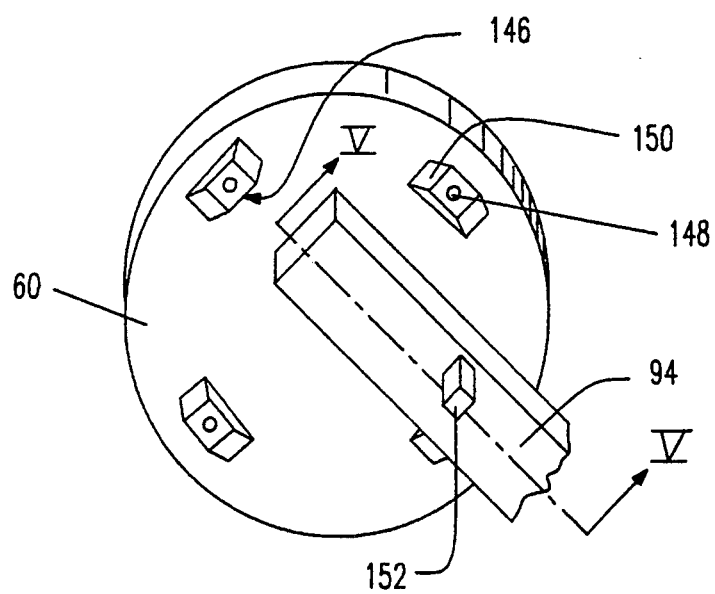
FIG. 4 is a bottom perspective view of a rotatable item handler platter constructed in accordance with an exemplary embodiment of the present invention.
Figure 5:
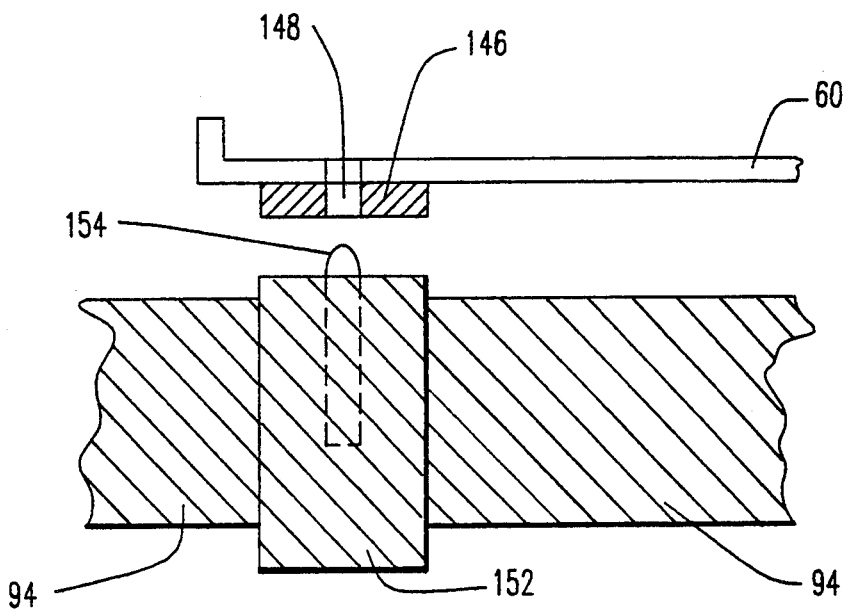
FIG. 5 is side cross-sectional view of the rotatable item handler platter of FIG. 4 along line V—V showing a platter position control constructed in accordance with an exemplary embodiment of the present invention.

Referring now to FIGS. 4 and 5, there is depicted a preferred means for controlling platter 60 position. In the embodiment shown, the bottom of the platter 60 bears a plurality of shot pin receivers 146. The receivers 146 are positioned around the periphery of the platter 60 at angular displacements having operational significance to the item handler 24 (not shown) mounted on the top of the platter 60. For example, a first receiver 146 may correspond to the item handler 24 being in the straight ahead position and ready to extend towards the items 30 carried on the caddy 26; a second receiver 146 may be positioned 90 degrees in the clockwise direction relative to the first which corresponds to the item handler 24 reaching into the right shelf bank 14, etc. The receivers 146 protrude from the bottom surface of the platter 60 and have a shot pin opening 148 in the approximate center thereof. The receivers 146 have ramps 150 on either side of the opening 148 to provide a gradual rise from and return to the bottom surface of the platter 60. A shot pin cylinder 152 is illustrated protruding from the item handler base 94, it could, however, be installed on the base 94 sandwiched between the base 94 and the platter 60 such that it would not be visible from the bottom. FIG. 5 illustrates a shot pin 154 retracted within the shot pin cylinder 152. In operation, the platter 60 would be fixed at a selected position by rotating the platter 60 with the platter motor 96 until the appropriate shot pin receiver 146 approaches the shot pin 154 protruding from the shot pin cylinder 152. The shot pin 154 would then be extended, typically by compressed air. If the shot pin is extended slightly early it encounters first the bottom surface of the platter and then the ramp 150 of the receiver 146 which wedges the shot pin 154 downwards an amount sufficient to allow continued rotary motion. Upon the shot pin 154 engaging the shot pin opening 148 it projects up into the opening 148 locking the platter 60 securely in position. A sensor may be provided which senses that the shot pin 154 has landed in the opening 148 inducing a control signal to depower the platter motor 96.

It can be seen that the objects of the present invention are realized by the foregoing system. Specifically, the present invention is faster than known systems in that, the caddy loader 40, mass offloader 72 and the caddy 26 cooperate to perform simultaneous bulk transfers of items to and from the caddy 26. This frees the dolly 20, item handler 24 and caddy 26 to perform other tasks while the bulk group of items 30 are being accumulated or disbursed. In addition, the plurality of shelves 28 of the caddy 26 permit a plurality of items 30 to be taken on the dolly 20 and accessed by the item handler 24 so that multiple transfers can be made during any one trip by the dolly 20 from an on/off load point and back. The caddy 26 further permits transfers to occur between shelves in the shelf banks 12 and 14 without the caddy 26 returning to an on/off load point. The caddy 26 and caddy loader 40 described herein could be retrofitted to existing systems economically. Further, the present invention, by cutting time and robotic item handler travel time, enhances throughput and decreases costs associated with wear and tear on the system.

In general, it should be understood that the embodiments described herein are merely exemplary and that a person skilled in the art may make many variations and modifications without departing from the spirit and scope of the invention as defined in the appended claims.

We claim:

1. A method for automatically transferring a plurality of items between a first location and a second location utilizing a system including caddy means for receiving said plurality of items, said caddy means including a plurality of substantially vertically oriented shelves, said caddy means being affixed to dolly means for carrying said caddy means between said first location and said second location, said dolly means including locomotion means and locomotion control means for moving said dolly means, item handler means affixed to said dolly means for transferring said plurality of items between said caddy means and said first location, said item handler means including first elevator means and first elevator control means for positioning said item handler means at a selected elevation, caddy loader means for simultaneously loading said plurality of items on said caddy means, said caddy loading means including a plurality of substantially vertically oriented shelves matching said orientation of said shelves of said caddy means, second elevator means and second elevator control means for adjusting the elevation of said caddy loader means, item pusher means for simultaneously pushing said items off from said caddy loader shelves to said caddy means shelves, and control means for managing and controlling said system, said method comprising the steps of:
   A. transferring said plurality of items from said first location to said caddy means;
   B. carrying said caddy means on said dolly means proximate to said second location;
   C. performing a selectable sequence of transfers of said items between said caddy means and said second location with said item handler means.

2. A method in accordance with claim 1, wherein said step of transferring said plurality of items includes the steps of:
   A. loading said caddy loader means with said plurality of items; and
   B. positioning said caddy means proximate said caddy loader means;
   C. executing a bulk transfer of said items from said caddy loader means to said caddy means.

3. A method in accordance with claim 2, wherein said item handler means includes a rotatable base member with item gripper means disposed on a top surface thereof and control means for controlling rotation of said base member and said item gripper means, and wherein said step of loading said caddy loader means includes
   A. suspending said caddy loader means at a selected height via said second elevator means and corresponding control means;
   B. depositing one of said items on a first caddy loader shelf;
   C. vertically repositioning said caddy loader means to a second selected height;
   D. depositing another one of said items on a second caddy loader shelf;
   E. repeating said steps of depositing and vertically repositioning until said caddy loader shelves are filled to a selected degree.

4. A method in accordance with claim 3, wherein said step of executing a bulk transfer includes the steps of:
   A. elevating said caddy loader means to a level at which said plurality of shelves of said caddy loader means and those of said caddy means are coplanar; and
   B. activating said item pusher means causing said items to be pushed from said caddy loader shelves to said caddy shelves.

5. A method in accordance with claim 4 wherein said step of performing a selectable sequence of transfers includes alternatively, variously and selectively;
   A.
   (i) inducing said elevator means to align said item handler means with one of said items on a selected one of said caddy shelves;
   (ii) rotating said rotatable base member to the degree required to align said item gripper means with said one of said items;
   (iii) grasping said one of said items from said one of said selected caddy shelves with said item gripper means;
   (iv) repositioning said item gripper means proximate a selected storage space in said second location via said elevator means and said rotatable base member;
   (v) releasing said one of said items from said item gripper means to allow said one of said items to come to rest on said selected storage space;
   B.
   (i) inducing said elevator means to align said item handler means with a second one of said items in said second location;
   (ii) rotating said rotatable base member to the degree required to align said item gripper means with said second one of said items;
   (iii) grasping said second one of said items from said second location with said item gripper means;
   (iv) repositioning said item gripper means proximate one of said caddy means shelves via said elevator means and said rotatable base member;
   (v) releasing said second one of said items from said item gripper means to allow said second of said items to come to rest on said one of said caddy means shelves;
   C. executing steps A (i) through (iii) and repositioning said item gripper means proximate a second one of said caddy means shelves and allowing another one of said items to come to rest on said second caddy means shelf.

6. A method according to claim 5, wherein said item gripper means is linearly extensible and retractable to permit said item gripper means to grasp said item beyond said rotatable base member when extended and draw said item onto said base member as said gripper means is retracted and wherein said steps of grasping further include the steps of
  A. linearly extending said item gripper means beyond said rotatable base member towards said one of said items;
  B. gripping said one of said items by said item gripper means;
  C. retracting said item gripper means; and
  D. drawing said one of said items onto said rotatable base member.

7. A method in accordance with claim 6, wherein said system includes onload means for sequentially loading items onto said caddy loader shelves and control means for controlling the loading of said items and caddy offload means for simultaneously offloading a plurality of said items from said caddy means onto a said caddy loader operating in offload mode, wherein said step of depositing is performed by said onload means, and after said step of performing a selectable sequence of transfers, further including the steps of
  A. carrying said caddy means on said dolly means proximate to said offload means and said caddy loader means in the offload mode and interposing said caddy between said offload means and said caddy loader means in the offload mode; and
  B. executing a bulk transfer of said plurality of items from said caddy means to said caddy loader means in offload mode by said offload means pushing said items from said caddy to said caddy loader in the offload mode.

8. A method in accordance with claim 7, wherein said offload means includes an offload controller for controlling said offload means and a plurality of parallel pusher arms extending from a common pusher frame member and having a vertical spacing therebetween matching that of said spacing between said caddy means shelves and wherein said step of executing a bulk transfer from said caddy means to said caddy loader means in offload mode includes:
  A. elevating said caddy loader means in offload mode to a level at which said plurality of shelves of said caddy loader means in offload mode and those of said caddy are coplanar; and
  B. activating said offload means causing said items to be pushed from said caddy means shelves to said caddy loader means in offload mode shelves.

9. A method in accordance with claim 8, wherein said system further includes caddy loader offload means for sequentially offloading items from said caddy loader means and further comprising the step of sequentially offloading said caddy loader means in the offload mode after said step of activating.

* * * * *